(12) United States Patent
Hwang et al.

(10) Patent No.: US 11,485,240 B2
(45) Date of Patent: Nov. 1, 2022

(54) MOBILE CARRIER WITH MUTUAL CHARGING

(71) Applicants: HYUNDAI MOTOR COMPANY, Seoul (KR); KIA MOTORS CORPORATION, Seoul (KR)

(72) Inventors: Jin Ho Hwang, Seoul (KR); Dong Eun Cha, Hwaseong-si (KR); Sang Heon Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 529 days.

(21) Appl. No.: 16/590,947

(22) Filed: Oct. 2, 2019

(65) Prior Publication Data
US 2020/0338993 A1  Oct. 29, 2020

(30) Foreign Application Priority Data

Apr. 23, 2019 (KR) .................. 10-2019-0047566

(51) Int. Cl.
| | | |
|---|---|---|
| *B60L 53/12* | (2019.01) | |
| *B60L 58/12* | (2019.01) | |
| *B62D 63/02* | (2006.01) | |
| *B60L 53/80* | (2019.01) | |
| *B60L 53/14* | (2019.01) | |

(52) U.S. Cl.
CPC ............... *B60L 53/12* (2019.02); *B60L 53/14* (2019.02); *B60L 53/80* (2019.02); *B60L 58/12* (2019.02); *B62D 63/025* (2013.01); *B60L 2200/24* (2013.01)

(58) Field of Classification Search
CPC .. A61G 2220/145; A61G 5/04; B62D 47/006; B62D 63/025; B60L 53/12; B60L 53/14; B60L 53/80; B60L 58/12
See application file for complete search history.

(56) References Cited

U.S. PATENT DOCUMENTS

| | | | |
|---|---|---|---|
| 2003/0127261 A1* | 7/2003 | Borroni-Bird | ......... B60G 7/003 180/65.1 |
| 2011/0224841 A1* | 9/2011 | Profitt-Brown | ......... B60L 58/12 701/2 |

(Continued)

FOREIGN PATENT DOCUMENTS

| | | | | |
|---|---|---|---|---|
| JP | 2014-106046 A | | 6/2014 | |
| KR | 20140036549 A | * | 3/2014 | .............. B60L 50/50 |

(Continued)

OTHER PUBLICATIONS

KR20180060435A Machine Translation (Year: 2022).*

(Continued)

*Primary Examiner* — David V Henze-Gongola
(74) *Attorney, Agent, or Firm* — Morgan, Lewis & Bockius LLP

(57) ABSTRACT

A mobile carrier includes a carrier controller configured to check an amount of charge of a main battery of a vehicle through communication with a vehicle controller, to check an amount of charge of a carrier battery, to compare the amounts of charge of the main battery and the carrier battery when the carrier is installed in the vehicle and to control mutual charging of the main battery and the carrier battery.

10 Claims, 4 Drawing Sheets

(56) References Cited

U.S. PATENT DOCUMENTS

| | | | | |
|---|---|---|---|---|
| 2013/0079962 A1* | 3/2013 | Ishikawa | ............ | B60L 15/2045 |
| | | | | 701/22 |
| 2019/0111793 A1* | 4/2019 | Christen | ................ | B60L 53/14 |
| 2020/0337918 A1* | 10/2020 | Hwang | ................ | A61G 3/061 |

FOREIGN PATENT DOCUMENTS

| | | | | |
|---|---|---|---|---|
| KR | 20180060435 A | * | 7/2018 | ............ B60L 11/182 |
| KR | 10-2019-0014642 A | | 2/2019 | |

OTHER PUBLICATIONS

KR20140036549A Machine Translation (Year: 2022).*
Korean Office Action dated Dec. 7, 2021, issued in corresponding Korean Patent Application No. 10-2019-0047566.

* cited by examiner

MOBILE CARRIER WITH MUTUAL CHARGING

CROSS-REFERENCE TO RELATED APPLICATION

This application claims the benefit of priority to Korean Patent Application No. 10-2019-0047566, filed on Apr. 23, 2019 in the Korean Intellectual Property Office, the entire disclosure of which is incorporated herein by reference.

TECHNICAL FIELD

The present disclosure relates to a mobile carrier capable of being used as a mobility unit outside a vehicle and being used as a vehicle seat when installed in the vehicle.

BACKGROUND

Recently, as autonomous driving technology has been developed, demand for various mobility units are also increasing. However, a traditional vehicle and a mobility unit are still being individually considered and developed, and a combination thereof has not been presented yet.

However, from the viewpoint of a user, it is more economical and efficient to own a combination of a vehicle and a mobility rather than both the vehicle and the mobility.

Up to now, in the case of a long distance, a user moves using a vehicle and then takes a mobility unit out of the vehicle and uses the mobility unit. The mobility unit is troublesome to separately charge at home.

The information disclosed in this section is only for enhancing understanding of the general background of the present disclosure and should not be taken as an acknowledgement or any form of suggestion that this information forms the prior art already known to a person skilled in the art.

SUMMARY

The present disclosure provides a mobile carrier capable of being used as a mobility unit outside a vehicle and being used as a vehicle seat when installed in the vehicle.

In accordance with an aspect of the present disclosure, a mobile carrier may include a carrier body, which includes carrier wheels for movement of the carrier body outside a vehicle, a seat for seating of a passenger, an operation unit for controlling the carrier or the vehicle in a state in which the passenger is seated on the seat, and a carrier battery to provide driving energy to the carrier wheels. The mobile carrier may further include a carrier controller configured to check an amount of charge of a main battery of the vehicle through communication with a vehicle controller, to check an amount of charge of the carrier battery, to compare the amounts of charge of the main battery and the carrier battery when the mobile carrier is installed in the vehicle and to control mutual charging of the main battery and the carrier battery.

Mutual charging of the main battery and the carrier battery may be possible through a wireless charging module when the carrier is installed in the vehicle.

The carrier controller may perform control to start mutual charging of the main battery and the carrier battery when the carrier is installed at a specific position in an internal space of the vehicle.

Mutual charging of the main battery and the carrier battery may be performed through a wired charging module when the mobile carrier is installed in the vehicle.

The carrier controller may perform control to start mutual charging of the main battery and the carrier battery by connecting the carrier body with the vehicle through the wired charging module, when the mobile carrier is installed at a specific position in an internal space of the vehicle.

The carrier controller may perform control to charge the carrier battery through the main battery when the amount of charge of the main battery is equal to or greater than a predetermined percentage.

The carrier controller may perform control to charge the carrier battery through the main battery when the amount of charge of the carrier battery is equal to or less than a predetermined percentage.

When a destination of the vehicle is input through the carrier controller or the vehicle controller, the carrier controller may determine whether the vehicle is capable of traveling to the destination with the amount of charge of the main battery of the vehicle.

When the carrier controller determines that the vehicle is not capable of traveling to the destination with the amount of charge of the main battery, the carrier controller may perform control to charge the main battery through the carrier battery.

The carrier battery may be detachable from the carrier body and may be replaceable.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Figure 1:
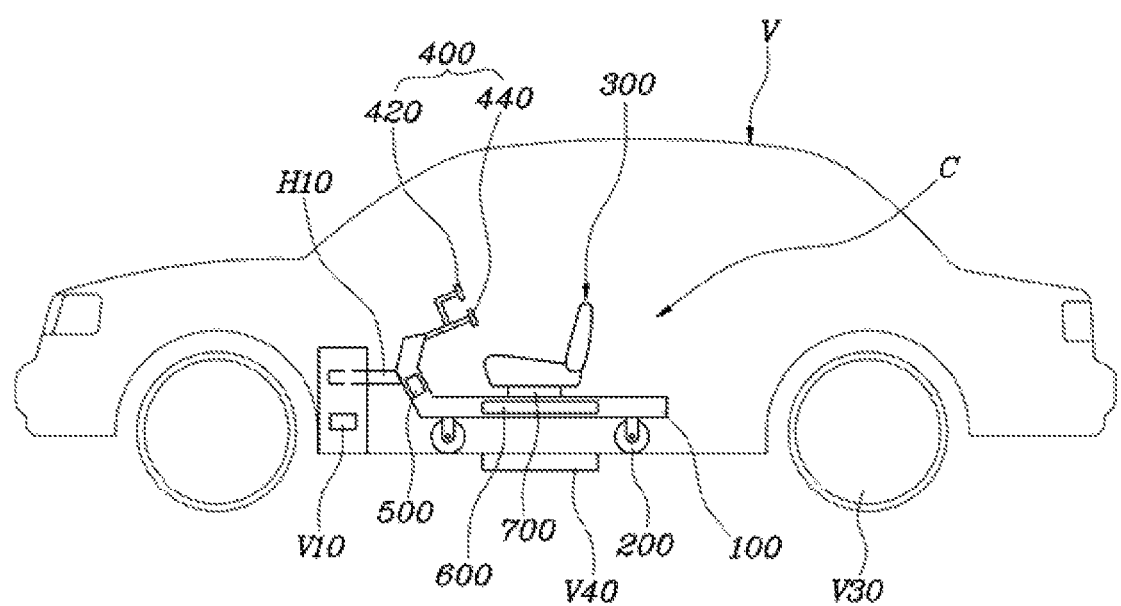
FIG. 1 is a diagram showing the configuration of a mobile carrier according to an exemplary embodiment of the present disclosure.
Figure 2:
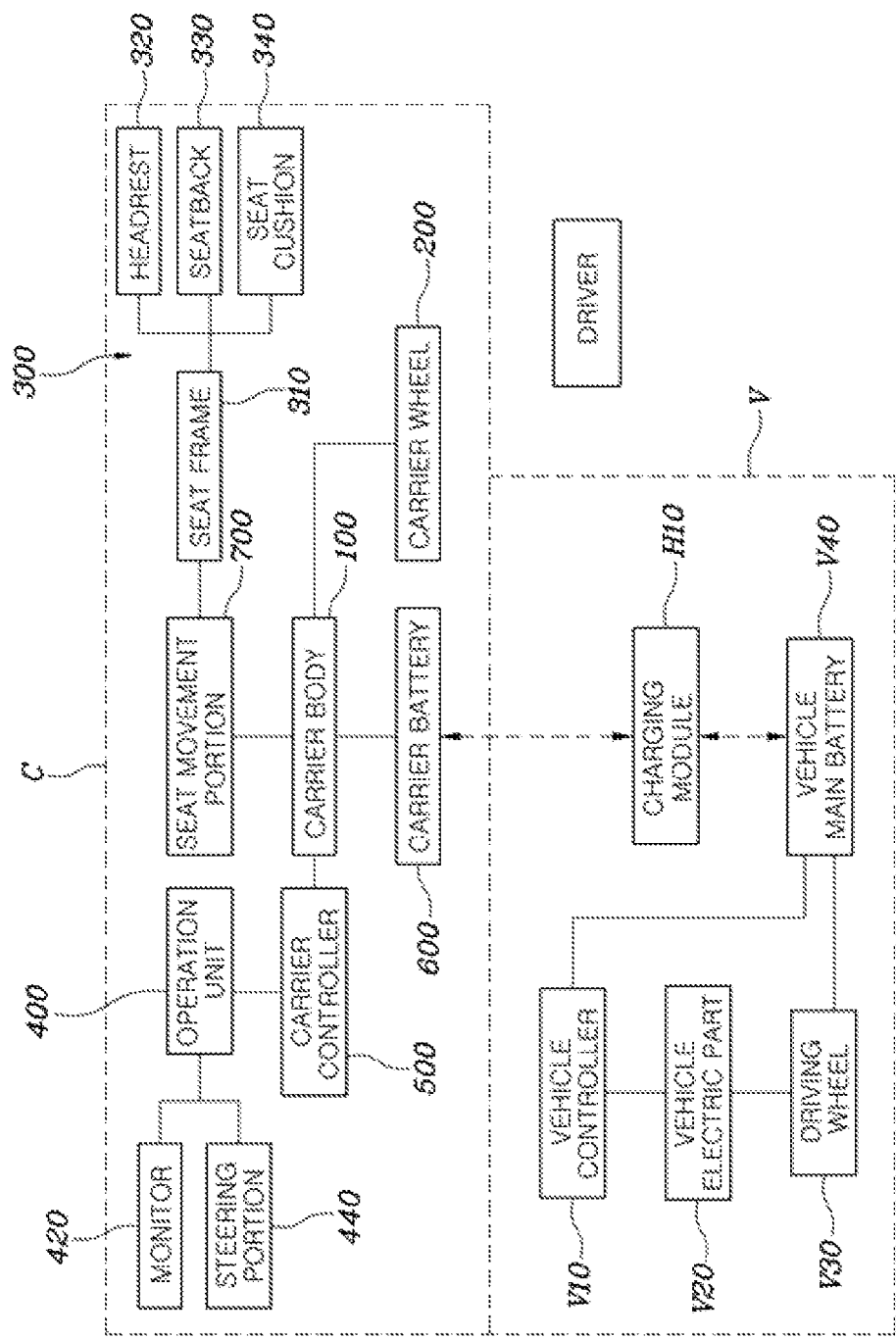
FIG. 2 is a diagram illustrating a mobile carrier and a vehicle according to an exemplary embodiment of the present disclosure.

FIG. 1 is a diagram showing the configuration of a mobile carrier according to an exemplary embodiment of the present disclosure, and FIG. 2 is a diagram illustrating a mobile carrier and a vehicle according to an exemplary embodiment of the present disclosure. Referring to FIGS. 1 and 2, a mobile carrier C according to the present disclosure includes a carrier body 100. The carrier body 100 includes carrier wheels 200 for movement of the carrier body 100 outside a vehicle V; a seat 300 for seating a passenger; an operation unit 400 for controlling the mobile carrier C or the vehicle V in a state in which the passenger is seated on the seat 300; and a carrier battery 600 to provide driving energy to the carrier wheels 200. The mobile carrier C further includes a carrier controller 500 for checking the amount of charge of a vehicle main battery V40 through communication with a vehicle controller V10, checking the amount of charge of the carrier battery 600, comparing the amounts of charge of the main battery V40 and the carrier battery 600 when the mobile carrier C is installed in the vehicle, and controlling mutual charging between the main battery V40 and the carrier battery 600.

The mobile carrier C according to one aspect of the present disclosure may be used as a personal mobility unit outside the vehicle V when a user is seated on the seat 300. On the other hand, the mobile carrier C may be used as a vehicle seat in an internal space of the vehicle V when the mobile carrier C is installed in the vehicle V. Therefore, the seat 300 may be included in the mobile carrier C, operation of the mobile carrier C may be performed outside the vehicle, and operation of the vehicle may be performed inside the vehicle. In addition, the seat 300 may be attached to and detached from the mobile carrier C of the present disclosure, and the seat 300 may be detached from the mobile carrier C and installed in the vehicle. In addition, the mobile carrier C may include a side panel and a roof and may be configured in a closed form, or may include only a roof and may be configured in a semi-open or an open form.

According to an exemplary embodiment of the present disclosure, the carrier body 100 may serve as a personal mobility car. In addition, the seat 300 may include a seat frame 310, a headrest 320, a seatback 330 and a seat cushion 340. In addition, the seat 300 may be installed in the carrier body 100 through a seat movement portion 700 to be moved on the carrier body 100. That is, the user controls the seat movement portion 700 to perform a sliding, tilting or rotation operation of an existing vehicle seat. Since the seat movement portion 700 connects the seat 300 with the carrier body 100, the user may adjust the position of the seat in a mobility unit mode and adjust the position of the seat in a vehicle mode.

In addition, the carrier wheels 200 are provided at the carrier body 100 for movement of the carrier body 100 outside the vehicle. The carrier wheels 200 serve to move the carrier outside the vehicle. The carrier wheels 200 serve to move the carrier C in a small range inside the vehicle, thereby changing the position of the passenger inside the vehicle. In one embodiment, an in-wheel motor may be used in the case of the carrier wheels 200. When the carrier is installed in the vehicle, the carrier wheels are received in the lower portion of the mobile carrier to fix the carrier inside the vehicle or to lower the position of the seat.

In addition, the carrier is provided with the operation unit 400. The operation unit 400 is provided to control the carrier C or the vehicle V in a state in which the passenger is seated on the seat. The operation unit 400 is provided with a steering portion 440 and a display 420 (e.g., a monitor, etc.). Through the steering portion 440, the carrier C may operate outside the vehicle and the vehicle V may operate inside the vehicle. Meanwhile, the operation unit 400 may be installed integrally with the carrier C or may be detachably installed in the carrier. When the operation unit is detachable, a mobile terminal such as a smartphone or a smart device of the user is applicable to the operation unit.

In addition, the carrier battery 600 is used to drive the carrier outside the vehicle and is used for mutual charging of the carrier battery 600 and the main battery V40 of the vehicle inside the vehicle. Meanwhile, the main battery V40 of the vehicle supplies driving energy to vehicle wheels V30.

The carrier controller 500 according to an exemplary embodiment of the present disclosure may be a processor (e.g., computer, microprocessor, CPU, ASIC, circuitry, logic circuits etc.). The carrier controller 500 may be implemented by a non-volatile memory (not shown) configured to store data, e.g., a program(s), software instructions reproducing algorithms, etc., which, when executed, controls operations of various components of the mobile carrier, and a processor (not shown) configured to execute the program(s), software instructions reproducing algorithms, etc., stored in the memory. Here, the memory and the processor may be implemented as individual semiconductor circuits. Alternatively, the memory and the processor may be implemented as a single integrated semiconductor circuit. The processor may include one or more processor(s).

The carrier controller 500 may communicate with the vehicle controller V10 to check the amount of charge of the main battery V40 of the vehicle. The carrier controller 500 may also check the amount of charge of the carrier battery 600 of the mobile carrier C. Therefore, when the mobile carrier C is installed in the vehicle, the amounts of charge of the main battery V40 and the carrier battery 600 are compared to perform mutual charging of the main battery V40 and the carrier battery 600. As a result, since mutual charging of the main battery V40 and the carrier battery 600 is possible, energy efficiency increases. Accordingly, when the mobile carrier C is installed in the vehicle, the carrier battery 600 may be charged through the main battery V40 of the vehicle, and it is possible to reduce troublesomeness that the user has to separately charge the mobile carrier C at home. In addition, in the case of an emergency such as discharging of the vehicle, since the main battery V40 of the vehicle can be charged through the carrier battery 600, the carrier battery 600 may serve as the auxiliary battery of the vehicle.

Through such components, the mobile carrier C may be used as a mobility unit outside the vehicle and then may be used as the seat and the steering portion 440 inside the vehicle V. In addition, since mutual charging of the main battery V40 and the carrier battery 600 is possible, usability of the vehicle V and the mobile carrier C increases. The carrier battery 600, which is insufficiently charged, may be charged through the main battery V40 such that the carrier may be more actively used in various environments, and the main battery V40, which is insufficiently charged, of the vehicle may be charged through the carrier battery 600 such that the vehicle may travel.

Referring to FIGS. 1 and 2, according to one aspect of the present disclosure, when the mobile carrier C is installed in the vehicle, mutual charging of the main battery V40 and the carrier battery 600 may be performed through a wireless charging module H10. The vehicle V or the mobile carrier C is provided with a wireless charging module H10. Power of the main battery V40 may be transmitted through the wireless charging module H10 to charge the carrier battery 600. In contrast, power of the carrier battery 600 may be transmitted through the wireless charging module H10 to charge the main battery V40. The wireless charging module H10 may transmit power using at least one wireless power transmission method (e.g., an electromagnetic induction method, an electromagnetic resonance method, an RF wireless power transmission method, etc.).

Figure 3:
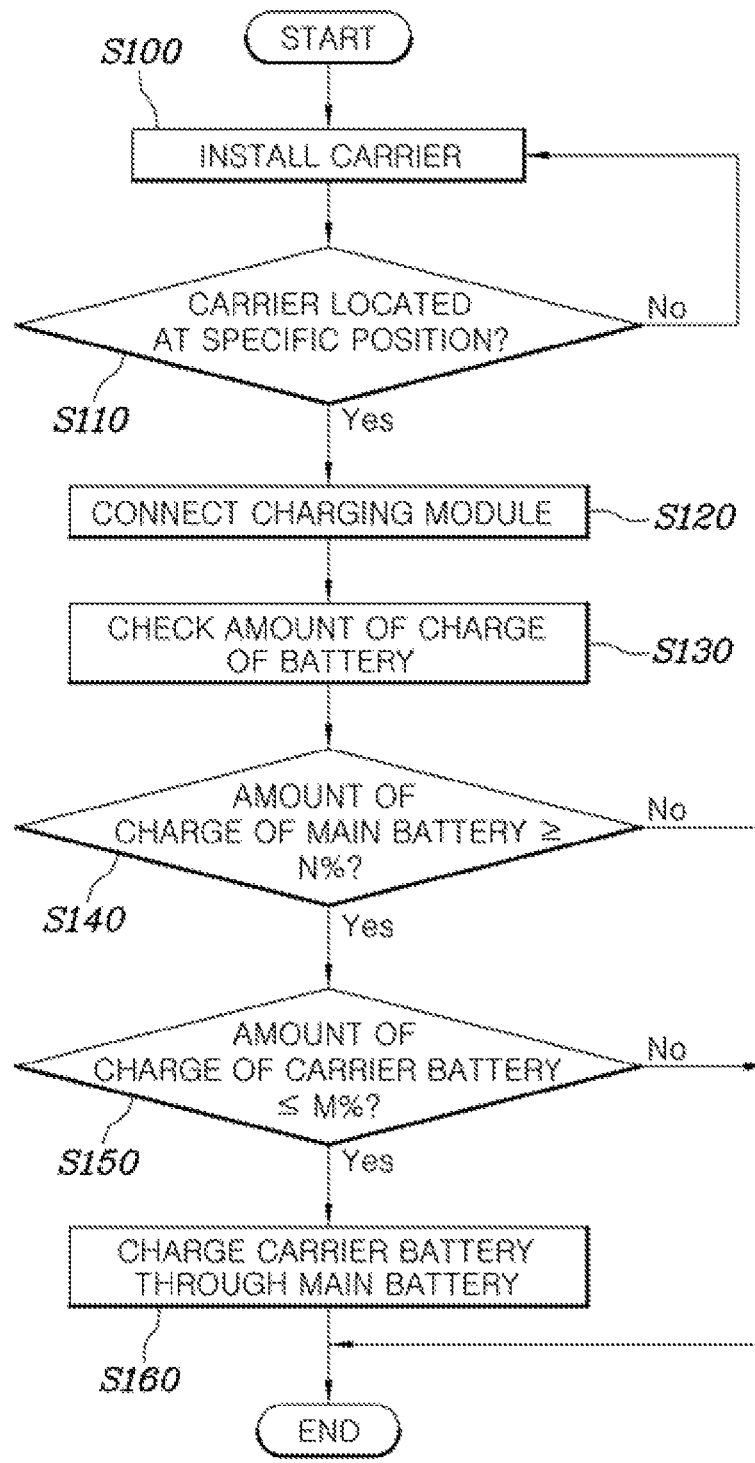
FIGS. 3 and 4 are flowcharts illustrating a method of controlling a mobile carrier according to an exemplary embodiment of the present disclosure.
Figure 4:
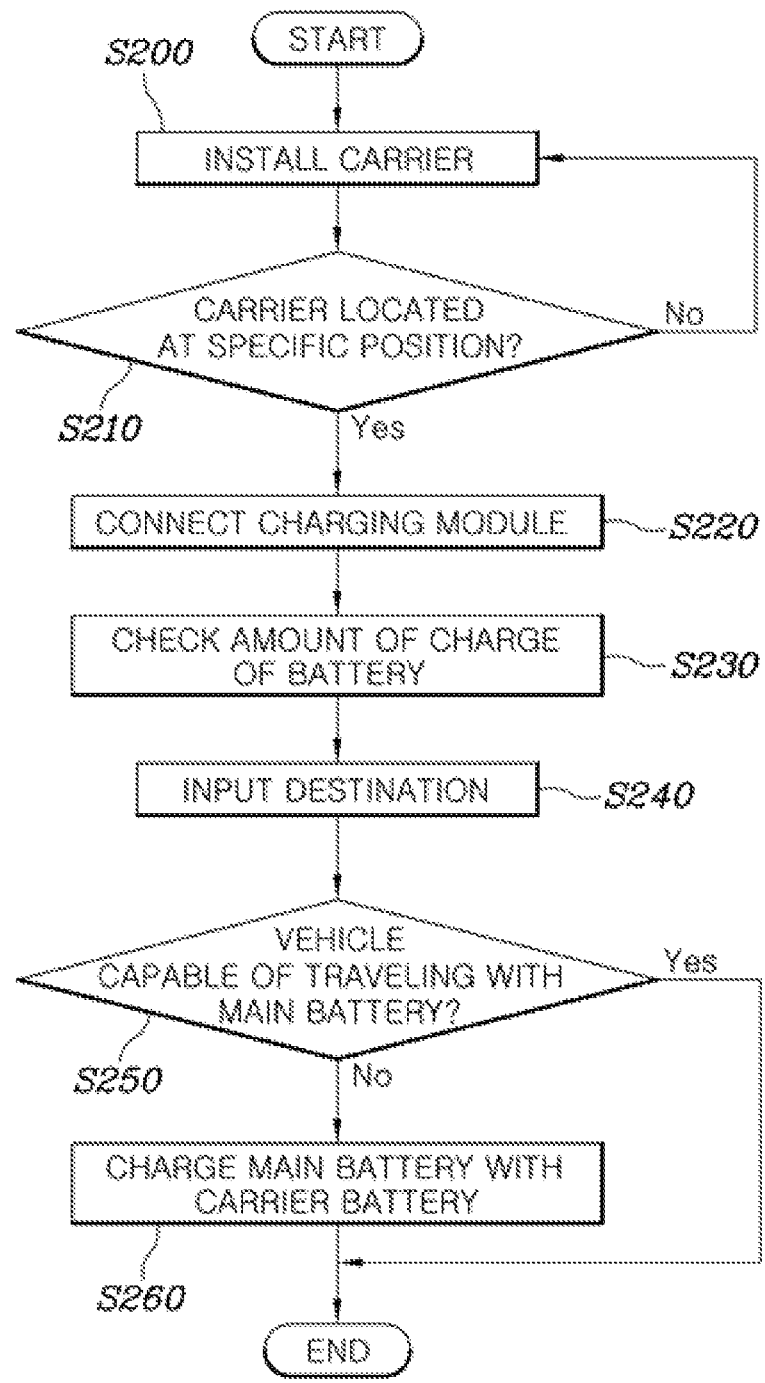

Specifically, as shown in FIGS. 3 and 4, the carrier controller 500 may perform control to start mutual charging of the main battery V40 and the carrier battery 600 when the mobile carrier C is installed at a specific position in the internal space of the vehicle V (S110 and S210). The mobile carrier C is independently driven as a personal mobility unit outside the vehicle V and then is used as a seat when installed in the vehicle V. In this case, mutual charging of the main battery V40 and the carrier battery 600 may be performed through the wireless charging module H10. Accordingly, the mobile carrier C needs to be installed at the specific position in the internal space of the vehicle V such that power is transmitted through the wireless charging module H10. Accordingly, the carrier controller 500 performs control to start the mutual charging when the mobile carrier C is installed at the specific position in the internal space of the vehicle V (S110 and S120).

Furthermore, referring to FIGS. 1 and 2, according to one aspect of the present disclosure, mutual charging of the main battery V40 and the carrier battery 600 may be performed through a wired charging module H10 when the mobile carrier C is installed in the vehicle V. The vehicle V or the mobile carrier C may include the wired charging module H10. Power of the main battery V40 may be transmitted through the wired charging module H10 to charge the carrier battery 600. In contrast, power of the carrier battery 600 may be transmitted through the wired charging module H10 to charge the main battery V40. The wired charging module H10 may be a power connector and may be provided on the vehicle V to protrude from the vehicle V and may be connected to the mobile carrier C or may be provided on the mobile carrier C to protrude from the mobile carrier C and may be connected to the vehicle V.

More specifically, as shown in FIGS. 3 and 4, the carrier controller 500 may perform control to start mutual charging of the main battery V40 and the carrier battery 600, by connecting the carrier body 100 with the vehicle V through the wired charging module H10, when the mobile carrier C is installed at the specific position in the internal space of the vehicle V (S110 and S210).

The mobile carrier C may be independently driven as a personal mobility unit outside the vehicle and then may be used as the seat when installed in the vehicle. In this case, mutual charging of the main battery V40 and the carrier battery 600 may be performed through the wired charging module H10. Accordingly, the carrier C needs to be installed at the specific position in the internal space of the vehicle V such that power is transmitted through the wired charging module H10. When the mobile carrier C is installed at the specific position, the wired charging module H10 protrudes from the vehicle V or the mobile carrier C such that the vehicle V and the carrier C are connected. Accordingly, the carrier controller 500 performs control to start the mutual charging when the mobile carrier C is installed at the specific position in the internal space of the vehicle V (S110 and S210).

Further, as shown in FIG. 3, the carrier controller 500 may perform control to charge the carrier battery 600 through the main battery V40 (S160), when the amount of charge of the main battery V40 is equal to or greater than a predetermined level (S140). The current amount of charge of the main battery V40 is compared with the full amount of charge of the main battery V40 (S130). When the current amount of charge of the main battery V40 is equal to or greater than a predetermined percentage of the full amount of charge (S140), the carrier battery 600 is controlled to be charged through the main battery V40. Accordingly, when the amount of charge of the main battery V40 is less than the predetermined percentage, only power of the main battery V40 is used as the driving energy of the vehicle V.

As shown in FIG. 3, when the amount of charge of the carrier battery 600 is equal to or less than a predetermined percentage (S150), the carrier controller 500 may perform control to charge the carrier battery 600 through the main battery V40 (S160). The current amount of charge of the carrier battery 600 is compared with the full amount of charge of the carrier battery 600. When the current amount of charge of the carrier battery 600 is equal to or less than a predetermined percentage of the full amount of charge (S150), the carrier battery 600 is controlled to be charged through the main battery V40. Accordingly, when the amount of charge of the carrier battery 600 exceeds the predetermined percentage, the carrier battery 600 is not charged and only power of the main battery V40 is used as the driving energy of the vehicle V.

Meanwhile, as shown in FIG. 3, the carrier controller 500 may perform control to charge the carrier battery 600 through the main battery V40 of the vehicle (S160), when the amount of charge of the main battery V40 is equal to or greater than the predetermined percentage (S140) and the amount of charge of the carrier battery 600 is equal to or less than the predetermined percentage (S150). Accordingly, when the amount of charge of the main battery V40 satisfies the level of power required to drive the vehicle and a sufficient amount of power remains, the carrier battery 600 is charged.

As shown in FIG. 4, in the present disclosure, when the destination of the vehicle V is input through the carrier controller 500 or the vehicle controller V10 (S240), the carrier controller 500 may determine whether the vehicle can travel to the destination with the amount of charge of the main battery V40 of the vehicle (S250). More specifically, when the vehicle cannot travel to the destination with the amount of charge of the main battery V40, the carrier controller 500 may perform control to charge the main battery V40 through the carrier battery 600. When the mobile carrier C is installed in the vehicle, the user may input the destination of the vehicle V to the carrier controller 500 or the vehicle controller V10. In this case, when the destination of the vehicle is input to the vehicle controller V10, information on the destination of the vehicle is transmitted to the carrier controller 500 through communication. The destination of the vehicle V includes the final destination of the passenger or a charging station for charging the main battery V40 of the vehicle. Accordingly, a distance to the destination of the vehicle and a time required to drive the vehicle to the destination are calculated using a GPS and a determination is made as to whether the vehicle can travel to the destination of the vehicle V with the amount of charge of the main battery V40 of the vehicle. When the vehicle cannot travel to the destination of the vehicle V with the amount of charge of the main battery V40, the carrier controller 500 may perform control to charge the main battery V40 through the carrier battery 600 (S260). In this case, the carrier battery 600 may serve as the auxiliary battery of the main battery of the vehicle.

Meanwhile, in the mobile carrier C of the present disclosure, the carrier battery 600 is detachably provided in the carrier body 100 and thus is replaceable. Accordingly, when the carrier battery 600 is discharged due to use of the mobile carrier C, the carrier battery 600 may be replaced to supply driving energy to the mobile carrier. In this case, replacement may be performed immediately by providing an extra carrier battery in the vehicle or a living space. Accordingly, even if the carrier battery 600 of the mobile carrier C is discharged, it is possible to immediately use the mobile carrier C without waiting for the charging time.

The mobile carrier of the present disclosure is capable of being used as a mobility unit outside the vehicle and being used as a vehicle seat when installed in the vehicle.

In particular, mutual charging of the battery of the vehicle and the battery of the mobile carrier may be performed when the mobile carrier is installed in the vehicle, thereby maximizing energy efficiency.

Although the preferred embodiments of the present disclosure have been disclosed for illustrative purposes, those skilled in the art will appreciate that various modifications, additions and substitutions are possible, without departing from the scope and spirit of the inventive concept(s) as disclosed in the accompanying claims.

What is claimed is:

1. A mobile carrier comprising:
a carrier body including:
carrier wheels for movement of the carrier body outside a vehicle;
a seat for seating of a passenger;
an operation unit for controlling the carrier or the vehicle in a state in which the passenger is seated on the seat; and
a carrier battery to provide driving energy to the carrier wheels; and
a carrier controller configured to check an amount of charge of a main battery of the vehicle through communication with a vehicle controller, to check an amount of charge of the carrier battery, to compare the amounts of charge of the main battery and the carrier battery when the mobile carrier is installed in the vehicle, and to control mutual charging of the main battery and the carrier battery,
wherein, when a destination of the vehicle is input through the carrier controller or the vehicle controller, the carrier controller determines whether the vehicle is capable of traveling to the destination with the amount of charge of the main battery of the vehicle, and
wherein, when the destination of the vehicle is input to the vehicle controller, information on the destination of the vehicle is transmitted to the carrier controller through communication.

2. The mobile carrier according to claim 1, wherein the mutual charging of the main battery and the carrier battery is performed through a wireless charging module when the mobile carrier is installed in the vehicle.

3. The mobile carrier according to claim 2, wherein the carrier controller performs control to start the mutual charging of the main battery and the carrier battery when the mobile carrier is installed at a specific position in an internal space of the vehicle.

4. The mobile carrier according to claim 1, wherein the mutual charging of the main battery and the carrier battery is performed through a wired charging module when the carrier is installed in the vehicle.

5. The mobile carrier according to claim 4, wherein the carrier controller performs control to start the mutual charging of the main battery and the carrier battery by connecting the carrier body with the vehicle through the wired charging module, when the carrier is installed at a specific position in an internal space of the vehicle.

6. The mobile carrier according to claim 1, wherein the carrier controller performs control to charge the carrier battery through the main battery when the amount of charge of the main battery is equal to or greater than a predetermined percentage.

7. The mobile carrier according to claim 6, wherein the carrier controller performs control to charge the carrier battery through the main battery of the vehicle when the amount of charge of the carrier battery is equal to or less than a predetermined percentage.

8. The mobile carrier according to claim 1, wherein the carrier controller performs control to charge the carrier battery through the main battery when the amount of charge of the carrier battery is equal to or less than a predetermined percentage.

9. The mobile carrier according to claim 1, wherein, when the carrier controller determines that the vehicle is not capable of traveling to the destination with the amount of charge of the main battery, the carrier controller performs control to charge the main battery through the carrier battery.

10. The mobile carrier according to claim 1, wherein the carrier battery is detachable from the carrier body and is replaceable.

* * * * *